April 3, 1962   J. H. ZILLMAN ETAL   3,027,849
FLUID-ACTUATED DOUBLE ACTING PUMP APPARATUS
Original Filed Dec. 27, 1956   6 Sheets-Sheet 1

INVENTORS
JACK H. ZILLMAN
ROY W. WAGONER
GLYNN H. WILLIAMS
FRANK W. SHARP
BY
Fulwider Mattingly & Huntley
ATTORNEYS April 3, 1962    J. H. ZILLMAN ETAL    3,027,849
FLUID-ACTUATED DOUBLE ACTING PUMP APPARATUS
Original Filed Dec. 27, 1956    6 Sheets-Sheet 2

INVENTORS
JACK H. ZILLMAN
ROY W. WAGONER
GLYNN H. WILLIAMS
FRANK W. SHARP
By Fulwider Mattingly & Huntley
ATTORNEYS April 3, 1962  J. H. ZILLMAN ETAL  3,027,849
FLUID-ACTUATED DOUBLE ACTING PUMP APPARATUS
Original Filed Dec. 27, 1956  6 Sheets-Sheet 3

INVENTORS
JACK H. ZILLMAN
ROY W. WAGONER
GLYNN H. WILLIAMS
FRANK W. SHARP
BY Fulwider Mattingly & Huntley
ATTORNEYS

April 3, 1962 J. H. ZILLMAN ETAL 3,027,849
FLUID-ACTUATED DOUBLE ACTING PUMP APPARATUS
Original Filed Dec. 27, 1956 6 Sheets-Sheet 4

INVENTORS
JACK H. ZILLMAN
ROY W. WAGONER
GLYNN H. WILLIAMS
FRANK W. SHARP
ATTORNEYS

United States Patent Office 3,027,849
Patented Apr. 3, 1962

3,027,849
FLUID-ACTUATED DOUBLE ACTING PUMP APPARATUS
Jack H. Zillman, Redondo Beach, Roy W. Wagoner, Alhambra, Glynn H. Williams, Huntington Park, and Frank W. Sharp, Compton, Calif., assignors to U.S. Industries, Inc., a corporation of Delaware
Original application Dec. 27, 1956, Ser. No. 630,973, now Patent No. 2,961,966, dated Nov. 29, 1960. Divided and this application Nov. 4, 1960, Ser. No. 75,649
6 Claims. (Cl. 103—228)

The present invention relates generally to pumping apparatus and more particularly to a novel and improved fluid-actuated double acting pump that is especially adapted for well pumping. This is a division of our copending application entitled Fluid-Actuated Double Acting Pump Apparatus, filed December 27, 1956, Serial No. 630,973, now Patent No. 2,961,966.

Oil is most often produced from a non-flowing oil well by means of a sucker rod-operated reciprocating pump. This type of pump employs a piston and cylinder adjacent the production zone of the well and connected to a surface located source of power by a string of sucker rods. The many disadvantages inherent to the use of the sucker rod-operated reciprocating pumps are familiar to those skilled in the art.

It is a major object of the present invention to provide a positively-acting displacement pump which eliminates these disadvantages.

It is a more particular object of the invention to provide a well pump having two pumping chambers which receive the liquid to be pumped, these pumping chambers each housing a bladder element which is alternately expanded and contracted so as to force the liquid to be pumped out of the pumping chambers into passages which lead to the top of the well.

Another object is to provide pumping apparatus of the aforedescribed nature employing a reversible electric motor coupled to a reversible pump, the motor operating in one direction until the pump has filled the first bladder and then in the opposite direction until the second bladder has been filled so as to pump a substantially continuous flow of oil to the earth's surface.

Another object is to provide pump apparatus of the aforedescribed nature incorporating unique means for timing the length of rotation of the electric motor in a given direction, so as to obtain maximum operating efficiency of the unit.

It is a further object of the present invention to provide pumping apparatus of the aforedescribed nature having means for preventing the internal pressurization of the bladders above a predetermined pressure. This feature contributes to a long and trouble-free service life for the apparatus.

It is yet another object of the invention to provide pumping apparatus of the aforedescribed nature wherein the fluid employed to operate the bladders is completely isolated from the well fluid being pumped. Accordingly, the internal operating parts of the pump are maintained free of foreign wear-inducing substances.

An important object of the invention is to provide pumping apparatus of the aforedescribed nature wherein the electric motor is operated in a first direction until the first bladder is filled with operating fluid to a predetermined pressure whereafter novel sensing means incorporated in the pumping apparatus automatically effects the reversal of the electric motor so as to effect the collapse of the first bladder and the filling of the second bladder to a predetermined pressure.

Another object is to provide pumping apparatus of the nature set forth in the paragraph set forth immediately hereinbefore wherein said sensing means is sensitive to the amount of energy required to operate said electric motor.

It is an additional object to provide pumping apparatus of the aforedescribed nature which is embodied in an elongated slender structure that may be lowered into a well of relatively small diameter.

It is yet an additional object of the invention to provide an improved electrical switching system.

Still a further object is to provide an electrical switching system wherein an electrical current is substantially reduced prior to being interrupted.

One additional object is to provide an electrical switching system which when activated reduces current flow then performs a switching operation at a point remote from the point of activation.

These and other objects and advantages of the present invention will become apparent from the following detailed description when taken in conjunction with the appended drawings, wherein:

FIGURE 2a is an enlarged central vertical sectional view of the double-acting pumping unit utilized with said pump apparatus;

FIGURE 2b is a downward continuation of FIGURE 2a;

FIGURE 3 is a vertical sectional view taken on line 3—3 of FIGURE 2a;

FIGURE 4 is a horizontal sectional view taken on line 4—4 of FIGURE 3;

FIGURE 5 is a vertical sectional view taken along line 5—5 of FIGURE 4;

FIGURE 6 is a horizontal sectional view taken on line 6—6 of FIGURE 2a;

FIGURE 7 is a horizontal sectional view taken on line 7—7 of FIGURE 2a;

General Arrangement

Figure 1:
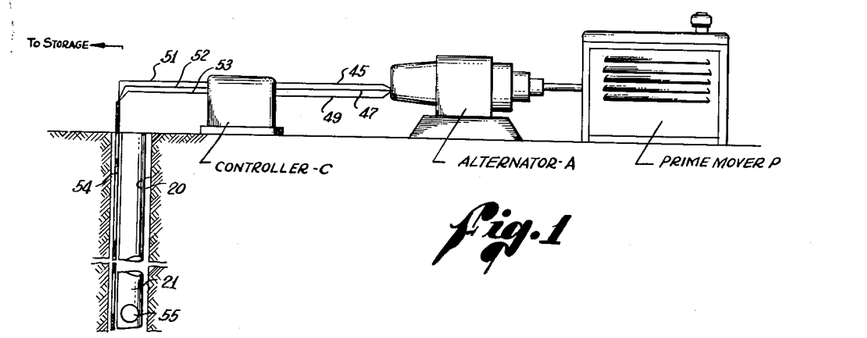
FIGURE 1 is an elevational view taken partly in central vertical section showing a preferred form of pumping apparatus embodying the present invention.

The preferred form of pumping apparatus embodying the present invention is adapted to be lowered into a well 20 by means of a string of tubing 21 which also has the purpose of conveying the pumped well fluid, as for example oil, to the top of the well. The pumping apparatus includes an elongated tubular housing 22 which is secured to the lower end of the tubing string 21 in a conventional manner. The housing 22 encloses an upper pumping section U and a similar lower pumping section L. The upper pumping section is formed with a pumping chamber 24 while the lower pumping section L is formed with a similar pumping chamber 26. An upper expansible-contractile member, such as a bladder formed of oil-resistant synthetic rubber 28, operates in the upper pumping chamber 24 while a similar expansible-contractile member 30 operates in the lower pumping chamber 26. The upper and lower pumping chambers are provided with inwardly-opening upper and lower inlet valves 32 and 34, respectively, for admitting production or crude oil into their confines. The upper and lower pumping chambers are likewise provided with outwardly-opening discharge valves 36 and 38, respectively, through which production oil may be forced out of the confines of the pumping chambers into a discharge passage 40 which extends upwardly through the upper and lower pumping sections. The upper end of the discharge passage 40 empties into a collection chamber 42 defined in the upper portion of the housing 22 above the upper pumping section U.

The upper and lower bladders 28 and 30 are adapted to be alternately expanded and contracted under the influence of an operating liquid supplied by a reversible pump 44. This pump 44 may be of the gear, vane or piston type and is coupled to a reversible three-phase electric motor 46. The pump 44 is in communication with the interior of the lower bladder 30 by means of a first operating liquid passage 48. The interior of the upper bladder 28 is in communication with the pump 44 by means of a second operating liquid passage 50. With this arrangement, rotation of the electric motor 46 in a first direction will cause one of the bladders 28 or 30 to be filled while at the same time it will effect the collapse of the other bladder. Thereafter, the motor will be operated in the opposite direction so as to withdraw the fluid from the expanded bladder and pump it into the collapsed bladder so as to effect the expansion of the previously-collapsed bladder and the concurrent collapse of the previously-expanded bladder. During the time the bladders are in a collapsed condition, their inlet valves 32 and 34 will permit the entry of production oil into the pumping chambers 24 and 26. When the bladders are expanded, the production oil contained within the pumping chambers will be expelled therefrom through the discharge valves 36 and 38. Since one bladder will always be undergoing expansion while the other is being contracted, this arrangement provides a substantially continuous flow of production oil that flows upwardly through the tubing string 21. An upwardly opening check valve 55 is arranged in the tubing string 21 above the housing 22.

A pressure relieving unit R is interposed between the pump 44 and the upper end of the operating liquid passages 48 and 50. The purpose of this unit is to prevent the imposition of excessive liquid pressures upon the interior of the bladders 28 and 30. The construction and operation of this pressure relieving unit R is fully set forth hereinafter.

Electric power for the motor 46 is provided by means of a conventional three-phase alternator A located at the earth's surface. This alternator A is coupled to a suitable prime mover P by leads 45, 47 and 49, and to the electric motor 46 by means of three leads 51, 52, and 53 housed within a suitable cable 54 in a conventional manner. Control over the electric current passing through these leads 51, 52 and 53 is effected by means of a controller C which may be partially or entirely surface-located, and the construction and operation of which is fully set forth hereinafter.

The Pumping Units U and L

Figures 2A, 3, 4, 5:
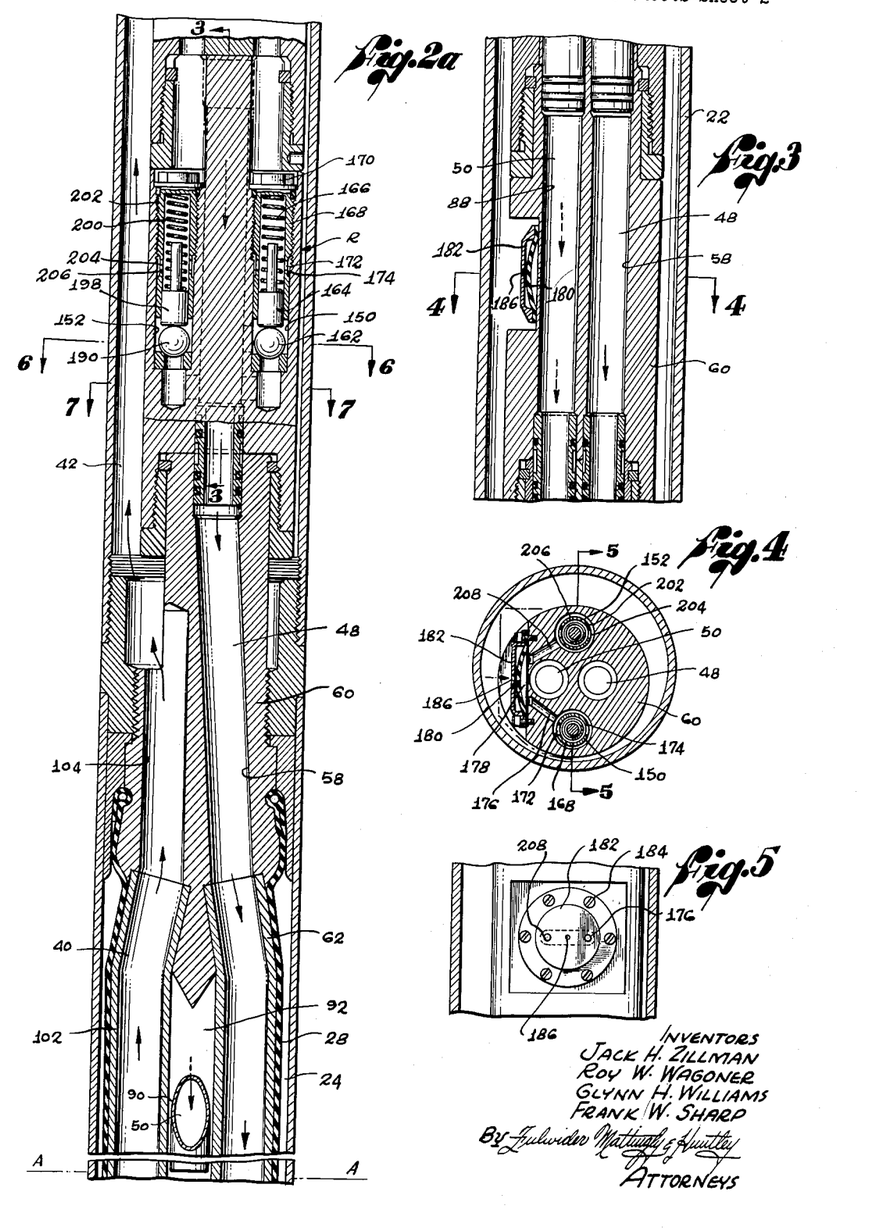
Figures 2B, 6, 7:
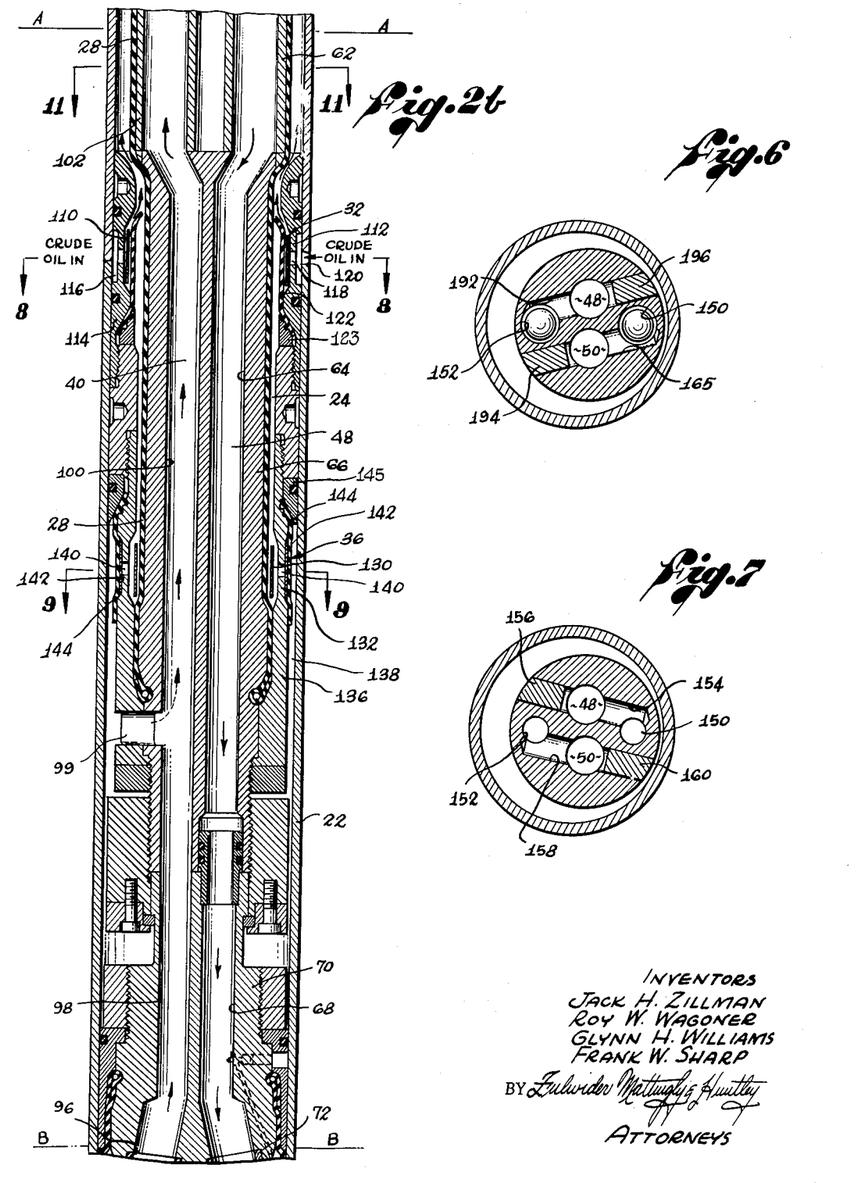
Figures 2C, 12, 14, 14A, 14B:
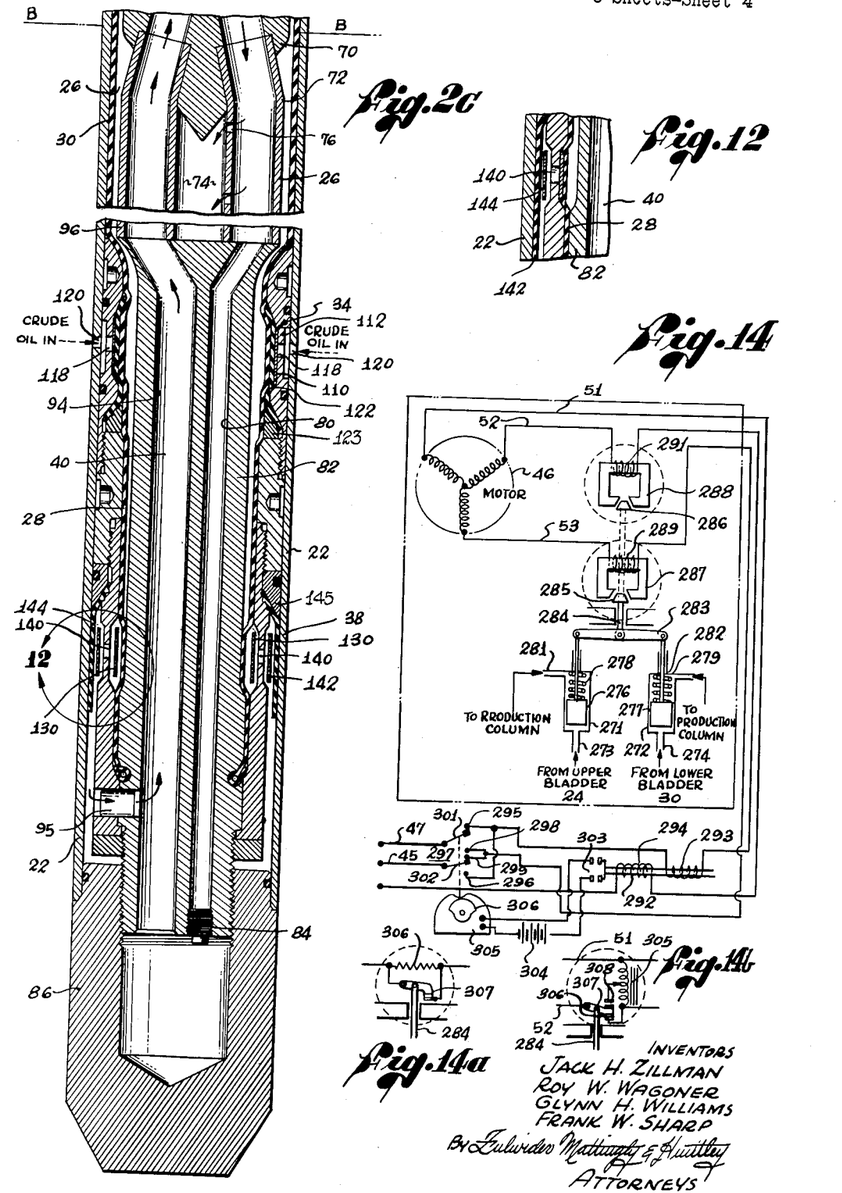
FIGURE 2c is a downward continuation of FIGURE 2b.
FIGURE 12 is an enlarged fragmentary view of the encircled area designated 12 in FIGURE 2c.
FIGURES 14, 14a and 14b show a second form of electrical circuit which may be employed with said pump apparatus.

More particularly, a detailed showing of the construction of the upper and lower pumping units U and L appears in FIGURES 2a, 2b and 2c. Referring to these figures and additionally to FIGURES 3 and 4, it will be observed that the upper portion of the first operating liquid passage 48 is defined by a vertically extending passageway 58 formed through a generally cylindrical upper mandrel 60. The lower end of the passageway 58 receives the upper end of a vertically extending pipe 62. The pipe 62 extends through the upper pumping chamber 24. The lower end of the pipe 62 is connected to a vertically extending passageway 64 formed through a second mandrel 66. The lower end of the passageway 64 is connected to the upper end of a passageway 68 formed in a third generally cylindrical mandrel 70 spaced immediately below the mandrel 66. The lower end of the passageway 68 receives the upper end of a second length of vertically extending pipe 72. The latter extends downwardly through the lower pumping chamber 26. The lower portion of the pipe 72 is in communication with the space 74 encompassed by the lower bladder 30 by means of a plurality of openings 76. The lower end of the pipe 72 is in communication with a fill passage 80 formed in a lowermost mandrel 82. The lower end of the fill passage 80 receives a fill plug 84. Access to this fill plug 84 is provided by means of a removable cap 86 that constitutes a closure for the lower end of the housing 22.

As is also indicated in FIGURES 2a, 2c, 3, 4 and 5, the upper portion of the second operating liquid passage 50 is defined by a vertically extending passageway 88 extending through the upper mandrel 60. The lower end of the passageway 88 is connected to the upper end of a pipe 90 that terminates within the space 92 encircled by the upper bladder 28, the lower end of this pipe 90 being open. Pipe 90 is arranged centrally of the housing 22.

With continued reference to the aforementioned figures, the lower end of the discharge passage 40 is defined by a vertically extending passageway 94 formed in the lowermost mandrel 82. The lower portion of the lower pumping chamber 26 below the latter's discharge valve 38 is connected with the passageway 94 by a plurality of radially extending apertures 95. The upper end of this passageway 94 is connected to a pipe 96 that extends upwardly through the lower pumping chamber 26 parallel with the aforedescribed pipe 72 employed to convey operating liquid to the interior of the lower bladder 30. As shown in FIGURE 2b, the upper end of the pipe 96 terminates in a passageway 98 formed through the mandrel 70. The lower portion of the passageway 98 is in communication with the lower portion of the upper pumping chamber 26 below the latter's discharge valve 34 by a plurality of radially extending apertures 99. The upper end of the passageway 98 is in communication with a passageway 100 formed through the mandrel 66 spaced above the mandrel 70. The upper end of the passageway 100 is in communication with the lower end of a pipe 102 that extends through the upper pumping chamber 24 parallel with the aforedescribed pipe 62 employed to conduct operating liquid to the interior of the lower bladder. The upper end of the pipe 102 is in communication with the lower end of a passageway 104 formed in the upper mandrel 60. The upper end of this passageway 104 empties into the collection chamber 42 encompassing the pressure relieving unit R, the pump 44 and the motor 46.

The Inlet Valves

Figures 8, 8A, 9, 10, 11:
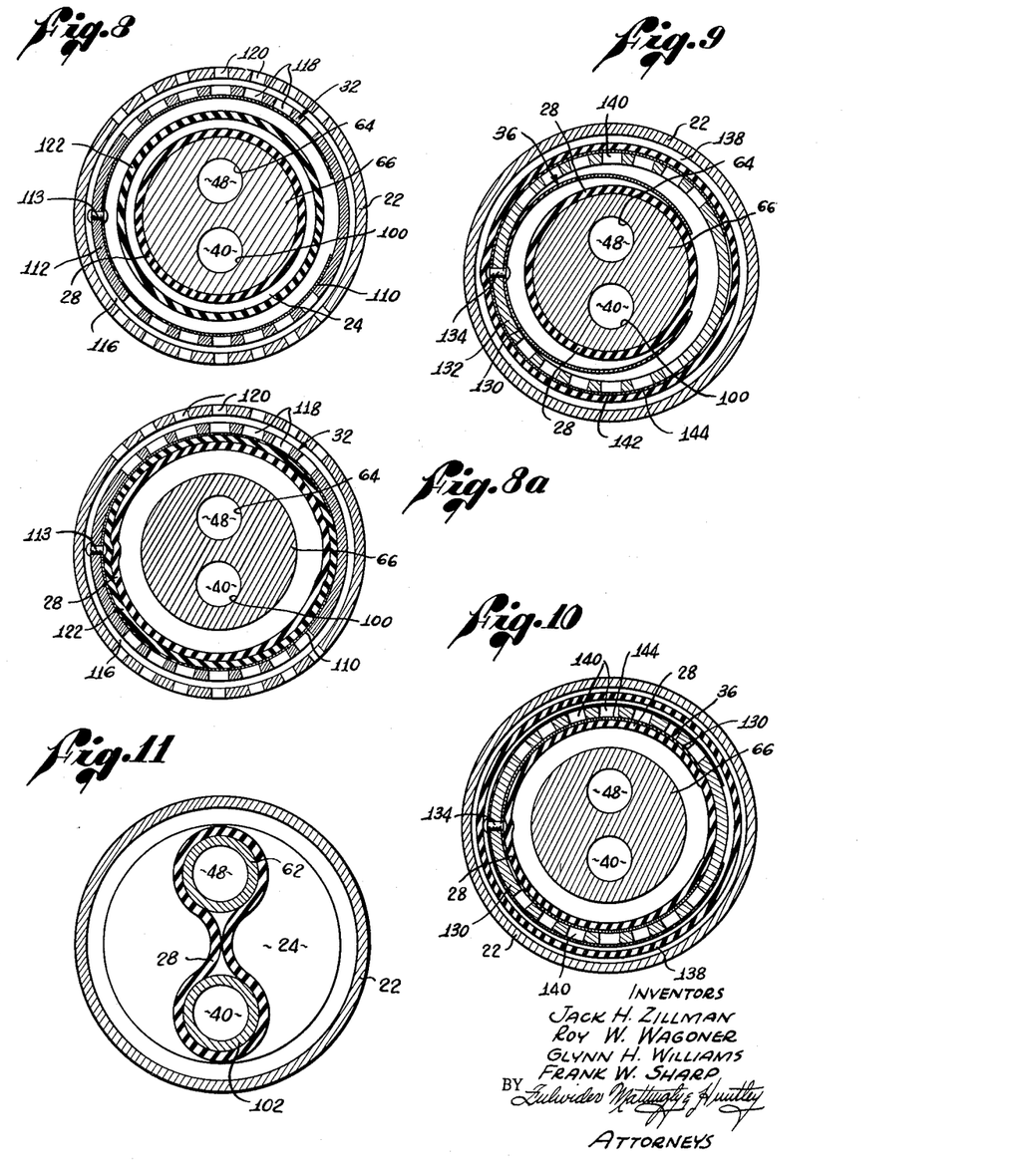
FIGURE 8 is a horizontal sectional view taken on line 8—8 of FIGURE 2b.
FIGURE 8a is a horizontal sectional view similar to FIGURE 8, but showing the parts thereof disposed in a different operating position.
FIGURE 9 is a horizontal sectional view taken on line 9—9 of FIGURE 2b.
FIGURE 10 is a horizontal sectional view similar to FIGURE 8 but showing the parts thereof disposed in a different operating position.
FIGURE 11 is an enlarged horizontal view taken on line 11—11 of FIGURE 2b.

The upper and lower inlet valves 32 and 34 are of identical construction and similar parts thereof bear the same reference numerals in the drawings. With particular reference to FIGURES 2b, 8 and 8a, the upper inlet valve 32 includes a flexible band 110 formed of spring steel, or the like, which has its mid-portion affixed to a rigid mounting ring 112 by a rivet 113. The mounting ring 112 is formed on the center portion of a sleeve 114 that is affixed within the housing 22 at the lower end of the upper pumping chamber 24. The mounting ring 112 is coaxial with the housing 22 and its outer periphery is of lesser diameter than the inner periphery of the housing so as to define an annulus 116. The mounting ring 112 is formed with a plurality of circumferentially spaced apertures 118 which are radially aligned with apertures 120 formed in the housing 22. An elastic sleeve 122, preferably formed of an oil resistant synthetic rubber, is encompassed by the flexible band 110. The lower end of the sleeve 122 is affixed to the sleeve 114 by a ring 123.

The flexible band 110 in its relaxed position assumes the retracted shape shown in FIGURE 8. At this time production oil will be free to flow inwardly into the bottom of the upper pump chamber 24 through the apertures 120 and 118. When the upper bladder 28 is expanded, the elastic sleeve 122 and the flexible band 110 will be expanded to their positions of FIGURE 8a. In this position, the elastic sleeve 122 will block inward flow through the apertures 118 and 120. It is important to note that in this expanded condition, the flexible band 110 will restrain extrusion of the elastic sleeve 122 into the aperture 118 of the ring 112. If such extrusion were permitted to take place, the elastic sleeve would be subject to damage.

The Discharge Valves

The outwardly-opening discharge valves 36 and 38 are also of identical construction and similar parts bear the same reference numerals. These upper discharge valves 36 and 38 are shown particularly in FIGURES 2b, 9 and 10. Referring thereto, the upper discharge valve 36 includes a flexible band 130 formed of spring steel or the like having its mid-portion affixed to a rigid mounting ring 132 by a rivet 134. The mounting ring 132 is formed in the intermediate portion of a sleeve 136 that is rigidly positioned within the housing 22 below the aforedescribed sleeve 114. The outer diameter of the sleeve 132 is smaller than the inner diameter of the housing 22 so as to define an annulus 138 therebetween. The mounting ring 132 is formed with a plurality of circumferentially spaced apertures 140. A second flexible band 142 has its mid-portion affixed to the exterior of the mounting ring 132 by the rivet 134. This outer flexible band 142 is arranged in the same plane as the inner flexible band 130 and may be formed of the same material. An elastic sleeve 144 encompasses the exterior of the mounting ring and flexible band. This elastic sleeve is preferably formed of an oil-resistant synthetic rubber. The upper end of the elastic sleeve 144 is affixed to the upper portion of the sleeve 136 by a ring 145.

In their relaxed position, the inner and outer flexible bands 130 and 142 will be disposed in their retracted position of FIGURES 2b and 9. At this time the upper bladder 28 is shown in its collapsed position. The elastic sleeve 144 then serves to restrain inward flow of production fluid through the apertures 140, while the outer flexible band 142 prevents the sleeve from being extruded into the mounting ring apertures 140 under the influence of well bore pressure. Referring now to FIGURE 10, the parts of the upper discharge valve 36 are shown arranged in the position which they assume when the upper bladder 28 is expanded. It will be observed that the exterior surface of the upper bladder has been expanded against the inner surface of the inner flexible band 130. Outward movement of the upper bladder 28 from its collapsed position of FIGURE 9 to its expanded position of FIGURE 10 effects the outward flow of production oil through the apertures 140 of the mounting ring 132 into the annulus 138, the elastic sleeve 144 being expanded outwardly under the influence of this pressurized production fluid. It should be particularly noted that the inner flexible band 130 positively restrains extrusion of the upper bladder 28 into the mounting ring apertures 140.

The Pressure-Relieving Unit R

The pressure-relieving unit R is shown particularly in FIGURES 2a and 3 through 7, and referring thereto it will be noted that this unit is mounted within the upper mandrel 60. The mandrel 60 is formed with a pair of vertically extending pressure-relieving chambers 150 and 152. As indicated in FIGURE 7, the lower portion of the passage 150 is in communication with the first operating liquid passage 48 by means of a transversely extending bore 154. A plug 156 is provided for the opposite end of the bore 154. The lower end of the other pressure-relieving chamber 152 is in communication with the second operating liquid passage 50 by means of a second transversely extending bore 158. The opposite end of this port is likewise closed by a plug 160. An upwardly-opening ball check 162 is positioned within the pressure relieving chamber 150 above its point of intersection with the bore 154. As indicated in FIGURE 6, a radially extending bore 165 connects the pressure relieving chamber 150 with the operating liquid passage 50 at a point above the ball check 162.

The ball check 162 is constantly biased downwardly by a plunger 164 that is backed by a coil compression spring 166. The plunger 164 and spring 166 are contained within a cylinder 168 which is threadably secured within the upper portion of the pressure-relieving chamber 150. The cylinder 168 is open at its bottom but is provided with an upper closure 170. The intermediate portion of the cylinder 168 is formed with a pair of apertures 172. The outer diameter of the cylinder 168 is reduced at this point so as to define an annulus 174. The annulus 174 is in communication with a transversely extending passageway 176, as indicated in FIGURE 4. The opposite end of this passage 176 is in communication with an equalizing chamber 178. The outer wall of this equalizing chamber is defined by a diaphragm 180, preferably formed of an oil-resistant synthetic rubber. A protective metal cover 182 is provided for the diaphragm 180. The diaphragm 180 and its protective cover are of annular configuration and their peripheral portions are secured to the mandrel 60 by a plurality of bolts 184. One or more apertures 186 provide communication between the exterior surface of the diaphragm 180 and the collection chamber 42.

A second upwardly-opening ball check 190 is positioned within the pressure relieving chamber 152 above its point of intersection with the radially extending bore 158. As indicated in FIGURE 6, another transversely extending bore 192 connects the pressure relieving chamber 152 with the operating liquid passage 48 at a point above the ball check 190. It will also be observed from FIGURE 6 that the ends of the radially extending ports 165 and 192 are closed by plugs 194 and 196. The ball check 190 is constantly biased downwardly by a plunger 198 that is backed by a coil compression spring 200. The plunger 198 and spring 200 are contained within a cylinder 202 similar to the aforedescribed cylinder 168 disposed in the chamber 150. The intermediate portion of the cylinder 202 is formed with a pair of apertures 204 and the outer diameter of the cylinder is reduced at this point so as to define an annulus 206. The annulus 206 is in communication with a transversely extending passageway 208, as indicated in FIGURE 4. The opposite end of this passageway 208 is in communication with the aforedescribed equalizing chamber 178.

General Operation of the Upper and Lower Pumping Units U and L

In the operation of the aforedescribed pumping apparatus, it may be assumed that the pump 44 is first operated in a direction which causes its discharge to be pumped downwardly through the operating liquid passage 48 into the space 74 encompassed by the lower bellows 30. As indicated in FIGURE 2c, this expansion of the lower bellows 30 will serve to force production oil outwardly through the lower discharge valve 38 through the apertures 95 and into the lower end of the discharge passage 40, the lower end of the latter being defined by the passageway 94 at this point. From the upper end of the passageway 94 the production fluid travels through the pipe 96 into the passageways 98 and 100 and then into the upper pipe 102. From the upper end of the pipe 102 the pumed production fluid flows through the passageway 104 into the collection chamber 42. The production liquid from the collection chamber 42 lifts the check valve 55 and passes upwardly through the tubing string 21.

During the time the lower bellows 30 is expanded, the upper bellows 28 will be maintained in its collapsed position of FIGURES 2b and 11. Accordingly, production fluid will be free to flow inwardly through the upper check valve 32 into the upper pumping chamber 24. Referring to FIGURE 11, it should be particularly noted that the positioning of the pipes 62 and 102 within the pumping chamber 24 affords a rigid support about which the upper bellows 28 may be collapsed. The provision of this support eliminates any wrinkling of the bladder, which wrinkling, if permitted, would subject the bladder to rapid wear and possible damage. When the internal pressurization of the lower bladder 30 has continued until the pressure existing therewithin reaches a predetermined magnitude, the controller C will effect a reversal of the motor 46 in the manner to be described hereinafter. Accordingly, the discharge of the pump 44 will now be directed into the upper end of the operating liquid passage 50 while the discharge thereof will be in communication with the operating liquid passage 48. Accordingly, the upper bladder 28 will now be expanded and the lower bladder 30 contracted. The production fluid admitted to the upper pumping chamber 24 by means of the upper inlet valve 32 will now be expelled outwardly through the upper discharge valve 36 so as to pass through the apertures 99 and into the portion of the discharge passage 40 defined by the passageway 100, as indicated in FIGURE 2b. At the same time, the lower intake valve 34 will admit production fluid into the confines of the lower pumping chamber 26. This operation will continue until the controller C again reverses the direction of rotation of the motor 46.

Figure 13:
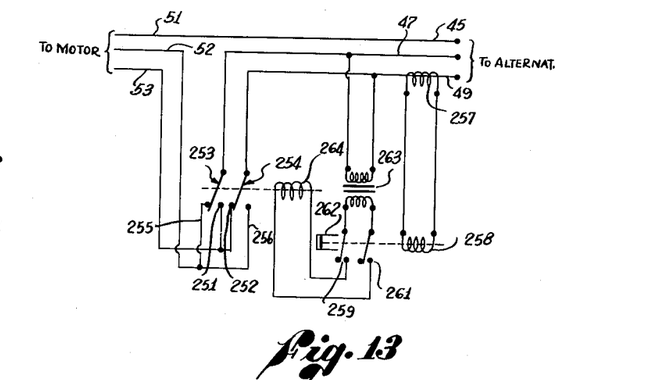
FIGURE 13 shows an electrical circuit which may be utilized with said pump apparatus.

The Controller C of FIGURE 13

Each time one of the bladders 24 or 30 reaches a predetermined pressure, the controller C effects a reversal of the motor 46. The controller C therefore senses the time required for the bladder pressure to reach a predetermined magnitude and then effects a reversal of the motor 46. As noted hereinabove, the motor 46 is a three-phase motor and therefore may be reversed by interchanging two of the three leads 51, 52 or 53 through which electrical current is supplied to the motor 46. Upon interchanging two such leads, the revolving magnetic field within the motor 46 is reversed and the direction of rotation of the motor changes.

Reference will now be had to FIGURE 13 which shows one form which the controller C may take to perform the function of interchanging two of the connections to the motor 46 when the pressure in one of the bladders reaches a predetermined level. In the system of FIGURE 13, the lead 53 is connected to two stationary contacts 251 and 252 which are respectively associated with movable contacts 253 and 254. The lead 52 is connected to stationary contacts 255 and 256 which are also respectively associated with the movable contacts 253 and 254. The movable contact 253 is connected to the lead 47, and the movable contact 254 is connected to the lead 49. The movable contacts 253 and 254 serve to interchange the connections between the leads 47 and 49 and the leads 52 and 53.

Encircling the lead 49 is a coil 257 which is serially connected with a relay 258. The relay 258 has contacts 259 and 261. The contacts 259 and 261 are also mechanically connected to a dash pot 262 which is threshhold in nature and upon being operated causes the contacts 259 and 261 to remain closed until the dash pot discharges a predetermined amount of fluid, after which the contacts open. The contacts 259 and 261 are coupled through a transformer 263 to the leads 47 and 49. Thus, electrical energy may pass from the leads 47 and 49 through the transformer 263 to the contacts 259 and 261 to be applied to a relay 264 which in turn controls the movable contacts 253 and 254.

Consider now that the controller C as shown in FIGURE 13 is operating within the system of FIGURE 1 such as to apply electrical energy to the motor 46. Initially assume that the movable contacts are in the positions shown such that the leads 47 and 52 are connected, and the leads 49 and 53 are connected. With these leads so connected assume that the motor 46 will rotate in such a direction as to fill the bladder 24. At a time when the pressure in the bladder 24 reaches a predetermined level, the load on the motor 46 will increase and slow down the motor causing it to draw an increased amount of electrical current. As increased current passes through the motor 46, the current in the leads connecting the motor to the alternator A will increase. The current in the lead 49 is therefore sensed by the coil 257 to determine when the pressure reaches a predetermined level. Upon the occurrence of an increase in current in the lead 49, a voltage is induced in the coil 257, causing current to flow in the relay 258. The current flow in the relay 258 causes the contacts 259 and 261 to close, thereby withdrawing the cylinder in the dash pot 262.

With the closure of the contacts 259 and 261, alternating-current electrical energy will pass through the transformer 263, and the contacts 259 and 261 and energize the relay 264. With the energization of the relay 264, the movable contacts 253 and 254 will be motivated to the right to interchange the connections between the leads 52 and 53 and the leads 47 and 49. The lead 52 is thus connected to the lead 49, and the lead 53 is connected to the lead 47. With these leads so connected the motor 46 will reverse its direction of rotation and the bladder 30 will now be filled. The dash pot 262 will maintain the contacts 259 and 261 closed for a period of time set to coincide as nearly as possible, to the time required to fill the bladder 30. After the passage of this time interval coinciding as nearly as possible to the time required for the bladder 30 to reach a predetermined pressure, the dash pot 262 will release the contacts 259 and 262 thereby de-energizing the relay 264. When the relay 264 is de-energized, the movable contacts 253 and 254 will return to the positions in which they are shown, such that lead 47 is connected to the line 52 and the lead 49 is connected to the lead 53. The motor 46 is thus again reversed and the cycle is repeated. It may therefore be seen, that each time the pressure in one of the bladders reaches a predetermined level the motor 46 is reversed to collapse the full bladder and inflate the empty bladder. Thereafter, the connections will again be interchanged and the direction of rotation of the motor 46 will again be reversed.

The Controller of FIGURES 14, 14a and 14b

Reference will now be had to FIGURE 14 which shows another form which the controller C may take. In the system shown in FIGURE 14, a portion of the controller C is located in the well adjacent to the motor 46. This portion of the system is set off by dashed lines in FIGURE 14.

In the controller of FIGURE 14, the instant when either of the bladders 24 or 30 is filled to a predetermined pressure is sensed to reverse the motor 46. The system for sensing the pressure in the bladders 24 and 30 includes cylinders 271 and 272 which are connected respectively to the spaces 92 and 74, respectively, encompassed by the upper bladder 24 and the lower bladder 30 by tubes 273 and 274. Positioned inside cylinders 271 and 272 respectively are pistons 276 and 277. Springs 278 and 279 are mounted respectively within the cylinders 271 and 272 to cause the pistons 276 and 277 to be urged to oppose the hydraulic pressures from within the bladders 24 and 30. Also opposing the pressures within the bladders is the oil pressure from the production column which is connected to intake ports 281 and 282 respectively of the cylinders 271 and 272. The pistons 276 and 277 are connected at the extremities of a rod 284 which in turn carries magnetic elements 285 and 286. The magnetic elements 285 and 286 are positioned to be urged into magnetic gaps in magnetic cores 287 and 288 respectively. The magnetic cores 287 and 288 carry windings 289 and 291, respectively, which are serially connected in the leads 52 and 53, respectively.

The aforedescribed portion of the controller system of FIGURE 14 is located below the surface in a well adjacent the motor 46. The leads 51, 52 and 53 are then brought to the surface to be connected to the surface-located portion of the controller system prior to passing to the alternator A. The lead 51, upon reaching the surface, is connected through one winding 292 of a differential relay 294. The lead 52, after passing through the coil 291, is brought to the surface and connected through the other winding 293 of the differential relay 294. From the winding 293 the line 52 passes to two fixed contacts 295 and 296 in a switch 297. The line 53, after passing through the winding 292, is connected to two other stationary contacts 298 and 299 of the switch 297. The movable contacts 301 and 302 of the switch 297 are connected respectively to the lines 47 and 45.

The two windings 292 and 293 of the differential relay 294 serve to control contacts 303 which are serially connected with a battery 304 and a small switching motor 305. The connection of these elements is such that when the contacts 303 are closed by the differential relay 294, the battery 304 energizes the motor 305. The motor 305 carries a switching cam 306 which serves to alter the position of the movable contacts 301 and 302 of the switch 297.

In the operation of the controller as shown in FIGURE 14 to periodically reverse the motor 46, an indication that a reversal occur is manifested when either of the pistons 276 or 277 is moved in an upwardly direction. That is, when the pressure within one of the bladders 30 or 24 reaches a predetermined level, one of the pistons 276 or 277 in the cylinders 271 and 272 will be moved in an upwardly direction due to the hydraulic pressure in either the line 273 or the line 274 overcoming the forces exerted by the production column and a spring. When one of the pistons 276 or 277 is so moved, the arm 283 will be raised thereby moving the magnetic elements 285 and 286 into the magnetic gaps in the cores 287 and 288, respectively. It may therefore be seen that when the pressure within one of the bladders 24 or 30 reaches the predetermined level at which the motor 46 is to be reversed, the air gaps in the magnetic cores 287 and 288 will be diminished by reason of the magnetic elements 285 and 286 moving into such air gaps.

With the closure of the magnetic circuit of the magnetic cores 287 and 288, the windings 289 and 291 will present substantial increased inductive impedance. Thus the impedance in the lines 52 and 53 is substantially increased when it is desired to reverse the motor 46. With the change of impedance presented to the lines 52 and 53, the electrical current flowing in the lines will be substantially diminished, thus creating an unbalance between the current flowing through the windings 292 and 293 of the differential relay 294. With the occurrence of such an unbalance, the differential relay 294 will close the contacts 303 thereby allowing the battery 304 to energize the motor 305. When the motor 305 is energized, it revolves the cam 306 such as to alter the position of the movable contacts 301 and 302 of the switch 297. The alteration in position of the movable contacts 301 and 302 will interchange the connections of the lines 45 and 47 with respect to the leads 52 and 53. With the interchanging of the leads direction of rotation of the motor 46 will be reversed, thereby relieving the pressure in the full bladder to such an extent as to withdraw the magnetic elements 285 and 286 from the magnetic gaps in the cores 287 and 288. The windings 289 and 291 now present greatly reduced impedance to the current flowing in the lines 52 and 53 with the result that substantially equal current now flows in each of the three lines to the motor 46, and with further result that the current in the differential relay 294 now becomes balanced, thereby allowing contacts 303 to open and deenergize the motor 305. In this manner, the switch 297 is altered in position each time the pressure in one of the bladders 24 or 30 reaches a predetermined level and the motor is thereby reversed to complete the other half-cycle of the operation.

It is to be noted in the system of FIGURE 14 that changeable inductances are utilized as the changeable impedances in the leads 52 and 53; however, various other changeable impedances might be utilized. Two such changeable impedances are shown in FIGURES 14a and 14b. The changeable impedance of FIGURE 14a includes a resistor 306 which is normally shunted out by contacts 307 however, when the rod 284 is urged upwardly, the contacts 307 will be opened causing the resistance 306 to appear in the lead and present an increase in impedance to the current flowing therein.

With regard to FIGURE 14b, an auto-transformer 305 is shown connected between two of the three leads, e.g. leads 51 and 52. The current in the lead 52 is then passed through one contact 306 of a double contact switch 307, such that the auto-transformer 305 is normally not effective in the circuit. However, when the rod 284 is urged upwardly, the movable contact of the switch 307 breaks the contacts 306 and makes the contacts 308 such that only a portion of the voltage between the leads 51, 52 is applied to the motor 46. That is, only a portion of the voltage between the lines is tapped off from the auto-transformer 305 to be applied to the motor 46.

It is to be noted in considering the changeable impedances described above that only the inductive impedances shown in FIGURE 14 allow the system to operate with no switching contact to be located beneath the surface in the oil wells. A distinct advantage thus exists in favor of the inductive impedance as maintenance in this system will be reduced.

In the operation of the system shown in FIGURE 14 it is to be noted that the current in the leads 51, 52 and 53 will be substantially reduced prior to the time when the switch 297 actually interchanges the connections between the leads. That is, due to the fact that the changeable impedances located in the lines 52 and 53 present an increased impedance to current flowing in the lines, prior to the time when its switching operation is to be performed, the current in these lines will be substantially reduced. The current in the line 51 will also be reduced due to the fact that the electrical current flowing into and out of any three phase system must always be equal and if current is reduced in two leads it will drop in the third. The result of this reduction in current prior to the performance of a switching operation is that the switch 297 does not interrupt heavy currents and therefrom may be much smaller. It may therefore be seen, that in the system of FIGURE 14, two distinct functions are performed, i.e. at the time when the reversal of the motor should occur the current flowing to the motor is reduced, then the actual switching operation is performed.

Figure 15:
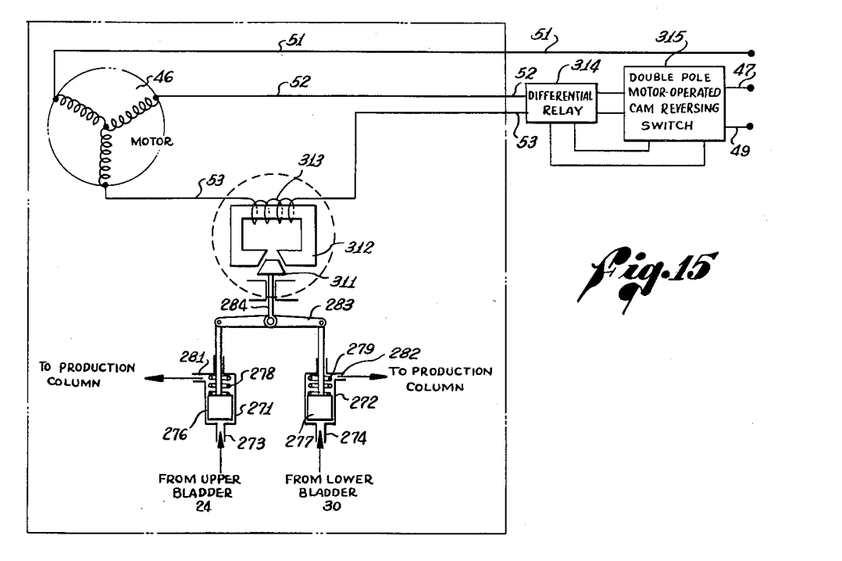
FIGURE 15 shows a third form of electrical circuit that may be employed with said pump apparatus.

The Controller of FIGURE 15

It is to be noted, that a single changeable impedance may be utilized in a system similar to FIGURE 14 to provide a signal which will effect the necessary switching operation. Such a system is shown in FIGURE 15. In FIGURE 15, similar parts to parts previously described with respect to FIGURE 14 carry a like reference numeral. The rod 284 which is urged upwardly each time the fluid pressure within one of the bladders 24 or 30 reaches a predetermined level is connected to a single magnetic element 311. The magnetic element 311 is thereby urged into a magnetic gap in a magnetic core 312. The magnetic core 312 carries a winding which is serially connected in the line 53. The lines 52 and 53 are then connected to a differential relay 314 which is similar to the differential relay just as described with reference to FIGURE 14. Connections are then made from the differential relay 314 to a double-pole motor-operated cam reversing switch 315 which is similar to the motor-operated switch shown with respect to FIGURE 14 including the switch 297 and the motor 305.

The operation of the controller shown in FIGURE 15 is quite similar to that shown in FIGURE 14. At a time when the pressure within one of the bladders 24 or 30 reaches a predetermined level, one of the pistons 276 or 277 will be urged upwardly imparting a motion to the arm 283 which will cause the rod 284 to move the magnetic element 311 into the magnetic gap of the core 312. When the magnetic element 311 is placed in the core 312, the magnetic lines of force set up by the winding 313 will be increased thus causing an increased inductance to result for the coil 313. The increased inductance of the coil 313 thus causes the current in the line 53 to be diminished and different from the current in the line 52 thereby activating the differential relay 314. The differential relay 314 then serves to reverse the connection between the lines 52 and 53 and the lines 47 and 49 just as was explained with respect to FIGURE 14.

In the system of FIGURE 15 which employs only a single changeable impedance, the electrical current is not reduced to the same extent which it is reduced in the system employing two changeable impedances. Therefore, the switch 315 in FIGURE 15 has more stringent requirements than the switch performing a similar function in FIGURE 14. It may therefore be seen, that by using only one changeable impedance element in the oil well, the switching operation performed at the surface becomes more difficult. The choice of application between the two systems as shown in FIGURES 14 and 15 will of course depend upon the circumstances surrounding the application.

Figure 16:
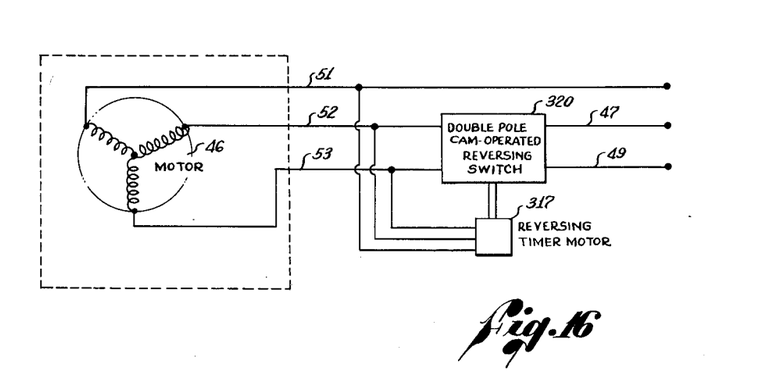
FIGURE 16 shows a fourth form of electrical circuit which may be employed with said pump apparatus.

Still another form which may be taken by the controller C of FIGURE 1 is shown in FIGURE 16. In FIGURE 16 the leads 52 and 53 are connected to a double-pole cam-operated reversing switch 320 similar to the switch 297 of FIGURE 14. The leads 51, 52 and 53 are also connected to a small three-phase timing motor 317. In the operation of this system of FIGURE 16, the period required for the motor 46 to fill one of the bladders 24 or 30 to a predetermined pressure is made to coincide to the running period of the reversing timer motor 317. In this manner, the timing motor 317 which is operated from the same source of power as the motor 46 and is thus synchronized, periodically interchanges the connections between the leads 52 and 53 and the leads 47 and 49. The interval of such an operation is made to coincide as nearly as possible to the interval during which the bladders 24 and 30 are filled to a predetermined pressure. In the system of FIGURE 16 considerable simplicity exists; however, the operation of the controller C is not directly controlled by the pressure within the bladders 24 and 30. Therefore, exact synchronism may not result; however, with the possible existence of reduced efficiency of operation the system of FIGURE 16 operates very satisfactorily in certain applications.

Operation of the Pressure-Relieving Unit R

Referring again to FIGURES 1 through 7, assuming that the pressure within the lower bladder 30 for example, should be raised above a desired maximum, the pressure-relieving unit R will serve to effect an automatic release of such pressure. In this manner, damage to the bladder from over-stretching will be avoided. The operating liquid pressure existing within the space 74 encompassed by the lower bladder 30 will be communicated to the lower portion of the pressure relieving chamber 150 by the bore 154, as will be clear from FIGURES 2a and 7. This pressure tends to lift the ball check 162 against the combined downward force provided by the spring 166 and the production fluid pressure existing within the collection chamber 42, the latter pressure being communicated to the upwardly-facing surfaces of the plunger 164 through the passageway 176, the end of this passageway remote from the pressure relieving chamber 150 communicating with the collection chamber 42. This arrangement permits the use of a smaller spring 166 than would be the case where the upper portion of the pressure-relieving chamber did not exist at the pressure of the pumped production fluid.

Assuming that the pressure within the lower bladder 30 increases to the extent that the ball check 162 is lifted from its seat, the lower end of the pressure-relieving chamber 150 will be placed in communication with the operating liquid passageway 50 by means of the passageway 165, as will be clear from examination of FIGURE 6. In this manner, the excess pressure will be automatically relieved from within the lower bladder 30, and communicated to the upper bladder 28. In a similar manner, should the pressure within the space 92 encompassed by the upper bladder 28 rise above a predetermined magnitude, the ball check 190 will be lifted off its seat so as to connect the lower portion of the other pressure-relieving chamber 152 with the operating liquid passage 48 that is connected to the lower bladder 30.

Conclusion

From the foregoing description it will be apparent that the present invention provides an efficient and fool-proof pumping apparatus that is especially adapted to be utilized in pumping oil wells. The operating liquid used for expanding and contracting the bladders is completely isolated from the production oil. This is an important consideration since sand and other contaminants are often carried by the production oil. Although bladders are shown as being the production oil pumping members, other forms of movable well pumping means may be employed, as for example a bellows, diaphragm or piston. The positioning of the inlet and discharge valves at the lower portion of the pumping chambers permits sand-bearing production oil to be pumped without causing the pumping chambers 24 and 26 to become filled with sand. Additionally, the positioning of the electric motor 46 above the pumping units U and L permits the upwardly flowing production liquid to cool the motor. The several unique controller arrangements for effecting reversal of the electric motor are both practical and foolproof. Their use eliminates the need for the complicated reversing valve mechanisms heretofore employed in pumping apparatus of this nature.

It is to be understood that the present invention is not limited to the specific arrangement of parts described but rather that various modifications and changes may be made thereto without departing from the spirit of the invention or the scope of the following claims.

We claim:

1. In a pumping apparatus having a housing, a pumping chamber formed in said housing and an expansible-contractile pumping member disposed within said pumping chamber, a valve controlling flow relative to said pumping chamber, comprising: a rigid mounting ring formed with circumferentially spaced apertures; a flexible band in encircling relationship with the major portion of said mounting ring; and an elastic sleeve coaxial with said mounting ring and movable radially into sealing engagement therewith, said band preventing extrusion of said sleeve into said apertures.

2. The subject matter of claim 1 further characterized in that said flexible band is disposed intermediate said ring and said sleeve and in radial alignment with the apertured portions of said ring.

3. The subject matter of claim 1 further characterized in that said band is formed of a resilient metal.

4. In a pumping apparatus having a housing, a pumping chamber formed in said housing and an expansible-contractile pumping member disposed within said pumping chamber, an inlet valve for said pumping chamber, comprising: a rigid mounting ring affixed to said housing and formed with circumferentially spaced apertures; a flexible band encircled by the inner periphery of said mounting ring and having its intermediate portion rigidly affixed to said ring; and an elastic sleeve coaxially disposed within said mounting ring and movable radially outwardly into sealing relationship therewith, said band preventing extrusion of said sleeve into said apertures.

5. In a pumping apparatus having a housing, a pumping chamber formed in said housing and an elastic bladder disposed within said pumping chamber, a discharge valve for said pumping chamber, comprising: a rigid mounting ring affixed to said housing and formed with circumferentially spaced apertures; an inner flexible band encircled by the inner periphery of said mounting ring and having its intermediate portion rigidly affixed to said ring; said bladder being encompassed by said band; an outer flexible band encompassing said mounting ring in alignment with said apertures and having its intermediate portion affixed to said mounting ring; and an elastic sleeve coaxially encircling said mounting ring and outer flexible band, said outer band preventing extrusion of said sleeve into said apertures and said inner flexible band preventing extrusion of said bladder into said apertures.

6. The subject matter of claim 5 further characterized in that said inner band is normally biased out of engagement with the apertured portions of said ring and is yieldably movable into engagement with said portions to prevent such extrusion.

No references cited.